United States Patent [19]

Belford

[11] Patent Number: 5,094,202
[45] Date of Patent: Mar. 10, 1992

[54] MECHANISM FOR CONVERTING RECIPROCATING MOTION INTO ROTARY MOTION

[76] Inventor: James R. Belford, 184 Lake Shore Dr., Pasadena, Md. 21122

[21] Appl. No.: 722,577

[22] Filed: Jun. 27, 1991

Related U.S. Application Data

[60] Division of Ser. No. 423,562, Oct. 13, 1989, which is a continuation of Ser. No. 71,103, Jul. 8, 1987, abandoned.

[51] Int. Cl.$^5$ ............................................. F02B 75/32
[52] U.S. Cl. ................................................ 123/197.4
[58] Field of Search .......... 123/197 R, 197 AC, 56 R, 123/56 AC

[56] References Cited

U.S. PATENT DOCUMENTS

| | | | |
|---|---|---|---|
| 1,123,172 | 12/1914 | Compton | 123/197 AC |
| 1,399,666 | 12/1921 | Short | 123/56 AC |
| 1,636,612 | 7/1927 | Noah | 123/197 R |
| 1,687,744 | 10/1928 | Webb | 123/197 R |
| 3,886,805 | 6/1975 | Koderman | 123/197 AC |
| 4,395,977 | 8/1983 | Pahis | 123/197 AC |
| 4,608,951 | 9/1986 | White | 123/197 AC |
| 4,658,768 | 4/1987 | Carson | 123/197 AC |

FOREIGN PATENT DOCUMENTS

| | | | |
|---|---|---|---|
| 3607422 | 9/1987 | Fed. Rep. of Germany ... | 123/197 R |
| 0909250 | 3/1982 | U.S.S.R. | 123/56 R |

*Primary Examiner*—David A. Okonsky
*Attorney, Agent, or Firm*—Millen, White & Zelano

[57] ABSTRACT

A two stroke reciprocating internal combustion or external compression engine which has at least two of needed power connecting posts mounted on each end of a carrier mechanical assembly which slides in a guided area by virture of the engine's stator design. In the carrier assembly there is incorporated an oval-type, internally toothed gear track which moves in reciprocating, linear motion. A circular, externally toothed gear is mounted on a rotatable, floating power shaft which extends perpendicular to the carrier. In that the gear is in constant engagement with the oval gear track, it is rotated by the linear movement of the reciprocating carrier. Proper gear engagement is insured by either a guider plate or by interlocking rollers in the carrier assembly. The output power end of the floating shaft is received in a mechanical unit which couples the floating shaft to an output shaft for use.

2 Claims, 14 Drawing Sheets

MECHANISM FOR CONVERTING RECIPROCATING MOTION INTO ROTARY MOTION

This is a division of application Ser. No. 07/423,562, filed Oct. 13, 1989 which is a continuation of Ser. No. 07/071,103, filed July 8, 1987, now abandoned.

BACKGROUND OF THE INVENTION

This invention relates to either a two stroke, reciprocating internal combustion or to an external compression engine.

Generally internal combustion engines, and the like, rely on crank shafts to convert the linear reciprocating motion of pistons to rotary motion. This is however a relatively complex, power consuming approach to motion conversion. The following patens are indicative of attempts to replace crank shafts with other types of mechanisms:

370,709; Sept. 1887; Mathias et al
712,361; Oct. 1902; Clarke
1,123,172; Dec. 1914; Compton
1,703,497; Feb. 1929; Noah
1,885,298; Nov. 1932; Schell
2,312,057; Feb. 1943; Williams
3,945,358; Mar. 1976; Collins
4,395,977; Aug. 1983; Pahis The above listed patents disclose devices which are generally impractical or overly complex and have never been of commercial significance.

OBJECTS OF THE INVENTION

The principal object of the invention is to convert linear reciprocating motion to smooth continuous rotating motion by use of a guided floating shaft assembly.

Other objects of the invention are to:
1. replace conventional crank shafts with a guided floating shaft assembly which applies direct force on toothed gears during expansion and all other cycles of devices such as internal combustion engines;
2. increase power output of engines as compared to conventional crank shaft engine which conventional engine experience power loss due to the change of the angular crank shaft position;
3. increase engine revolutions (RPM) at the floating shaft assembly for each stroke of the engine;
4. allow the flywheel of an internal combustion engine or the like to be placed either perpendicular to or in line with the body of the engine;
5. reduce the number of moving parts per power outlet;
6. reduce engine size by having a carriage block slider entering the cylinder wall area;
7. reduce weight due to power gained by using a floating shaft concept;
8. reduce component wear by reducing engine speed;
9. reduce exhaust noise levels by lowering exhaust gas pressure through increasing the reciprocating stroke length.
10. increase the engine's power output by increasing the expansion stroke simply through increasing the length of the straight part of an oval gear assembly used with the invention.

SUMMARY OF THE INVENTION

In accordance with one embodiment of the invention, the engine comprises two or more conventional piston assemblies opposed for providing the reciprocating motion needed to maintain proper movement of a slider block carriage assembly. The piston assemblies are connected to the sliding block carriage assembly at the ends thereof by a connecting post. The resulting mechanical assembly moves in reciprocating motion and is guided by a stator designed to assure straight and smooth linear operation, thus facilitating transformation of reciprocating motion into continuous rotating motion. The mechanical assembly includes two linear, parallel toothed tracks of equal length. The opposed linear tracks are connected at each end by two semi-circular, gear tracks of equal circumference, thus providing a continuous equally toothed gear arrangement. Power transfer from the tracks is accomplished by an externally toothed, circular, drive gear mounted on a floating shaft which extends perpendicular to said mechanical assembly. The drive gear is guided by an interlocked guider assembly which tracks the profile of the geared mechanical assembly with an interlocking roller assembly which is journaled to a floating shaft supporting the drive gear or proper guidance is maintained by a slotted plate affixed to the mechanical assembly carriage block. This arrangement guides the distal end of the floating shaft so as to continue rotation about the connecting circumference of the geared track, thus aligning the drive gear to receive the appropriately developing power of the pistons. This results in vertically movement of the floating shaft. The vertically movement is held true by means of thrust posts mounted to the engine stator. The thrusts posts will also absorb torque developed by the reciprocating motion of the mechanical assembly and transfer the torque to a floating shaft which rotates in bearings. Thus, the rotating power and vertical movement are both transferred to a power receiving unit. The power receiving unit comprises a constant velocity joint which is directly connected to an output shaft or a thrust angulating housing assembly may be used to distribute both the rotating power and the vertical movement of the floating shaft to a journaled output shaft. The output is directly connected to an output shaft mounted in a drive bearing fitted with an external toothed circular gear which drives a multi-purpose flywheel. The flywheel is journalled to an independent accessory drive shaft. The distal end of the drive shaft accepts need apparatus to drive required engine accessories.

While a preferred arrangement utilizes air internal combusted engine other prime movers may be utilized such as solenoids or mechanical movements.

DESCRIPTION OF THE PREFERRED EMBODIMENTS

Figure 1:
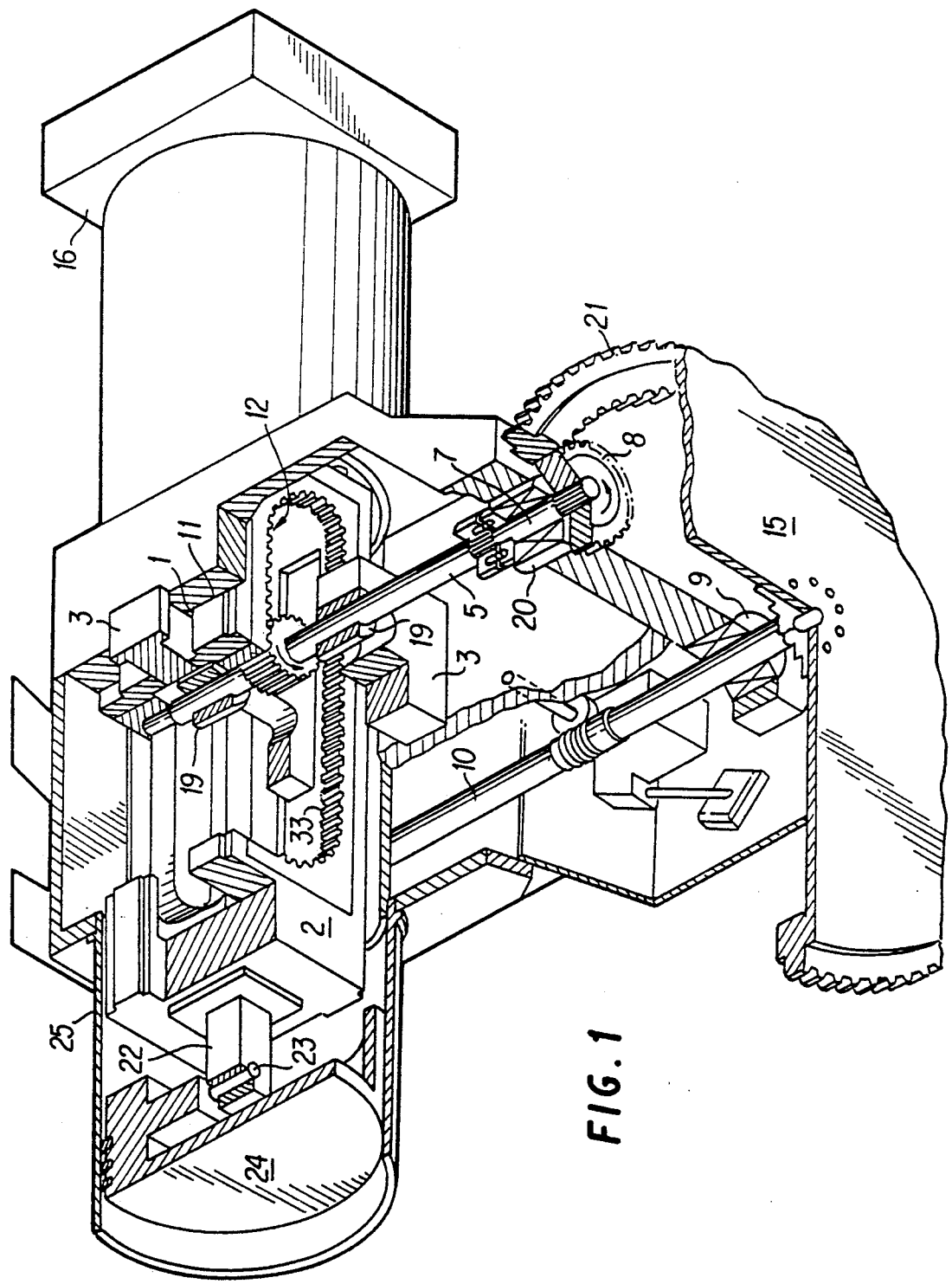
FIG. 1 is a perspective view, partially cut away, of a first embodiment of an engine configured in accordance with the instant invention.
Figure 2:
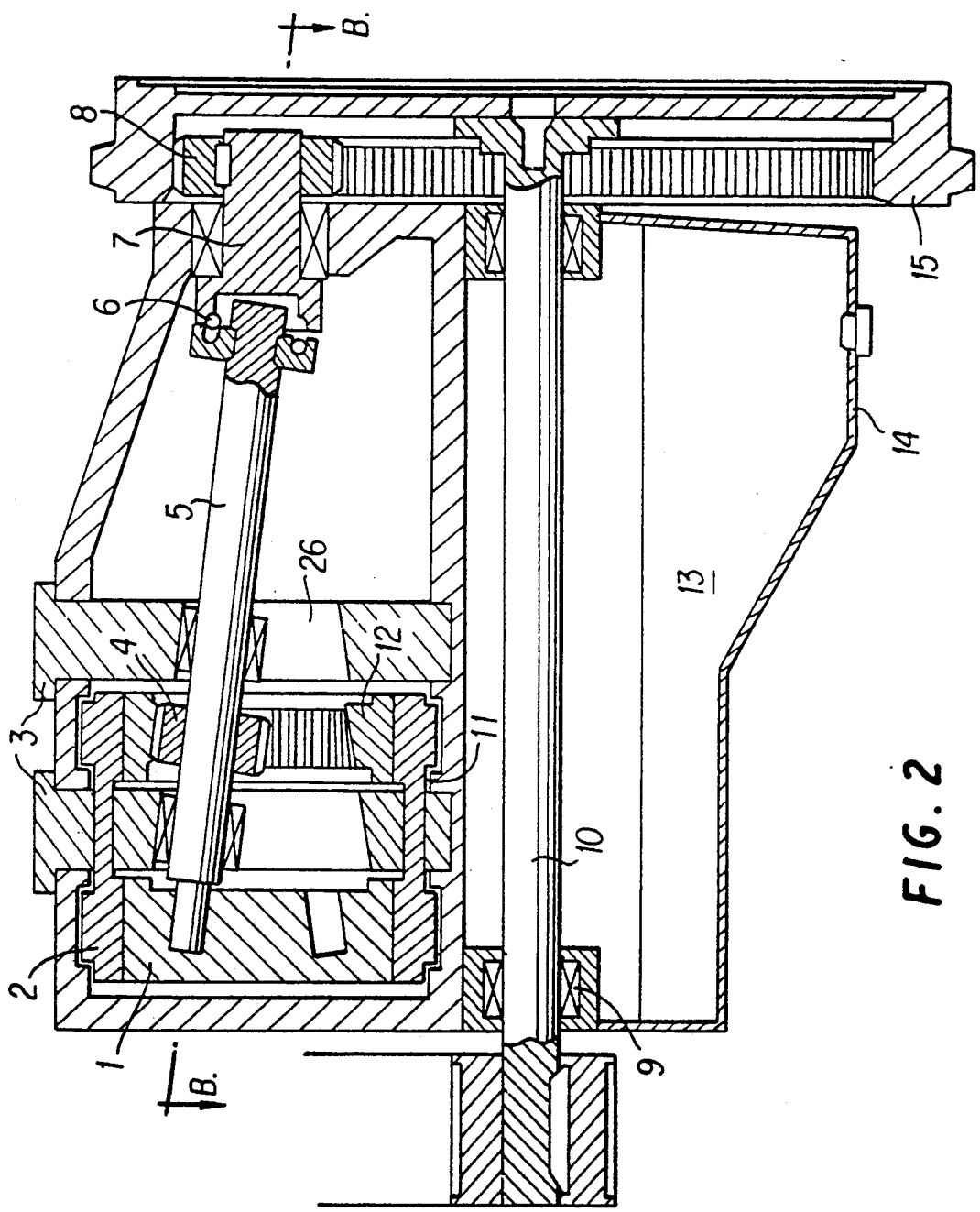
FIG. 2 is a side elevation of the engine of FIG. 1 taken along line 2—2 of FIG. 1.
Figure 3:
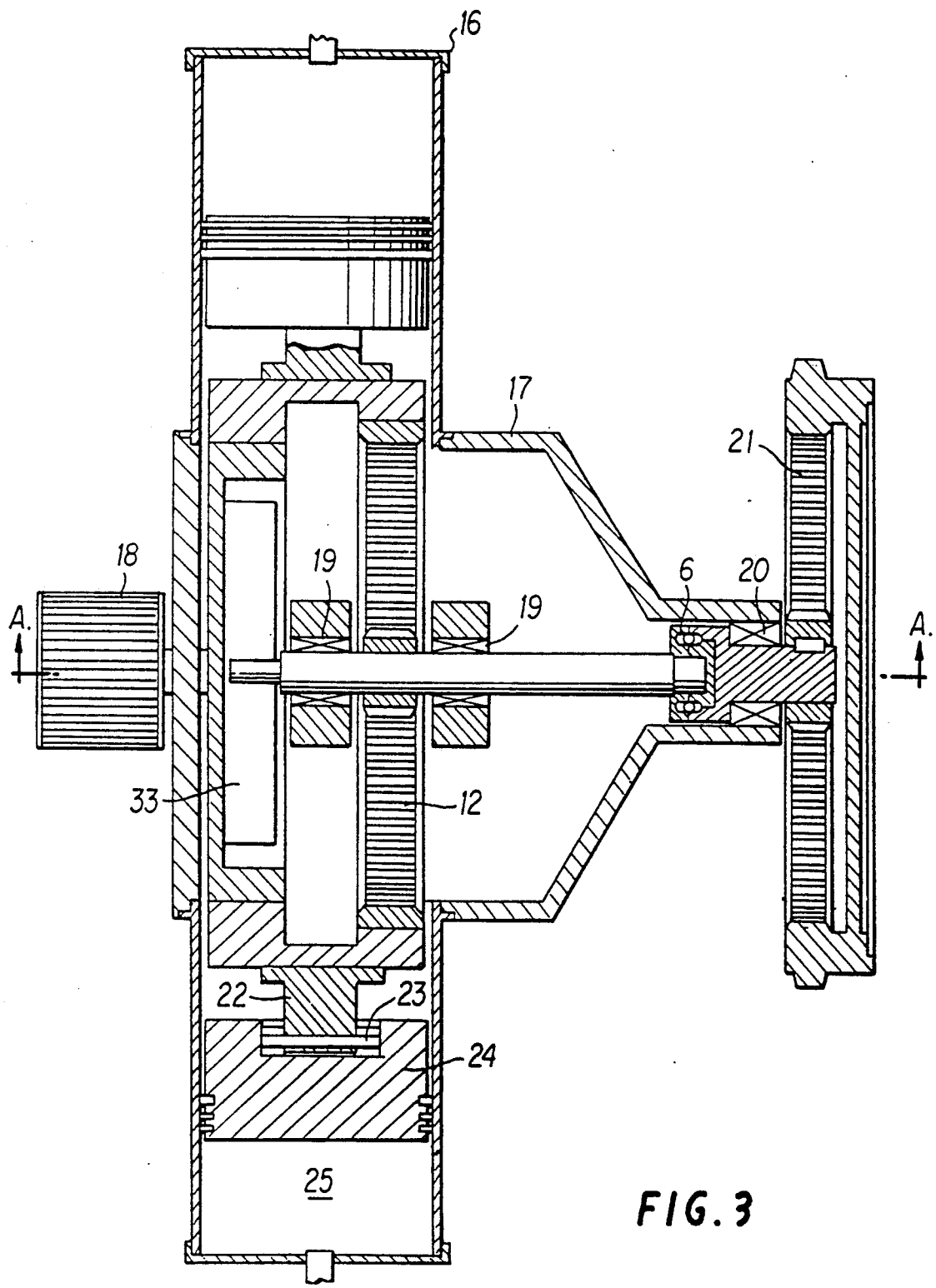
FIG. 3 is top elevation of the engine of FIG. 1 taken along line 3—3 of FIG. 1.

Referring to FIGS. 1, 2 and 3, conventional pistons 24 are housed in an engine stator body 25 which at distal ends is constructed to receive a conventional or modified head assembly 16 to complete working compression chambers. The opposed pistons 24 are mounted in opposed cylinders which are alternatively powered by, for example, injecting fuel therein and igniting the fuel according to conventional methods for operating internal combustion engines. In this way the pistons are pushed one at a time in alternative fashion in opposite direction. A wrist pin 23 which attaches piston 24 to a connecting post and thereby attaches the piston to a slider block carriage assembly 2, links the pistons into an assembly for reciprocating lineal movement in one direction.

An oval slider gear track 12 is attached and recessed in sliding block carriage assembly 2. On the back side of the oval slider gear track 12 there is attached and recessed the slider block guider channel 1. The sliding block carriage assembly 2 is guided by tracks covered by Teflon slider pads 11. The pads are mounted on tracks recessed into engine stator 25. Thrust support posts 3 are placed in front of and through the middle of the sliding block carriage assembly 2. The thrust support post 3 are fastened on the top and bottom of the engine stator 25 and are aligned perpendicular to the sliding block carriage assembly 2.

A floating shaft 5 has an end in the slide block guider channel 1 and rides on the guider roller surface 33. The floating shaft 5 extends outward through the thrust support posts 3 and is in the post. Floating shaft thrust bearings 19 pass through and over gear area in which a drive gear 4 is affixed and meshes with gear oval slider gear track 12. The floating shaft 5 continues outward and passes through the second thrust support post 3 and floating shaft thrust bearing 19 therein extends outward and is received by a constant velocity joint 6. Preferably, the constant velocity joint 6 is a fiber-type joint of the type used as universal joints on front wheel drive vehicles. The constant velocity joint 6 is affixed to a drive carrier shaft 7 which has drive carrier bearing 20 that hold the shaft 7 true. The other end of the drive carrier shaft 7 is coupled to drive gear 8 which meshes and drives the interiorly geared surface of a flywheel gear drive on a flywheel 15. The flywheel 15 is attached to an output drive shaft 10 which is supported as needed by output shaft bearings 9. A drive pulley 18 is attached adjacent the free end of the output shaft 10.

Figure 4:
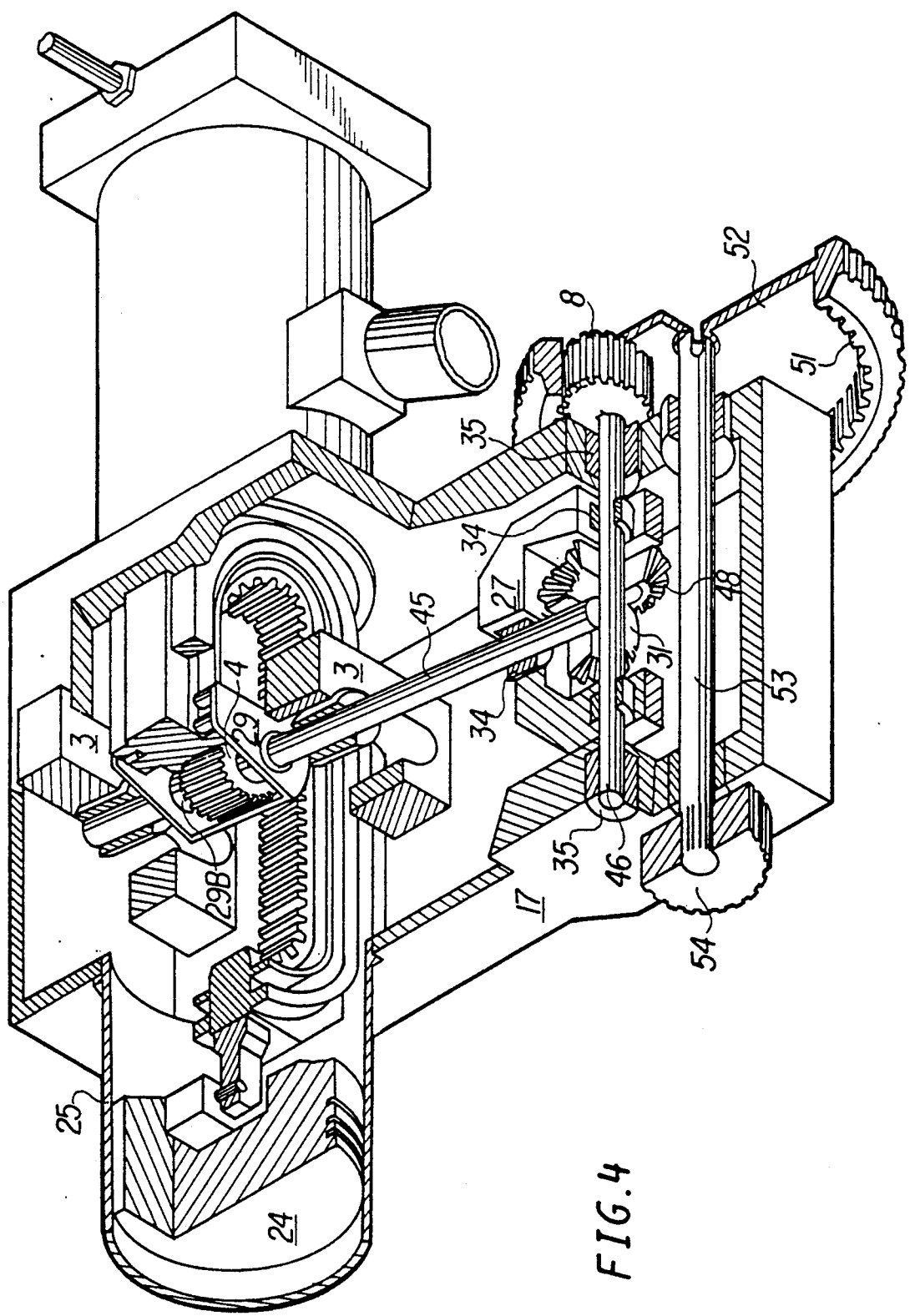
FIG. 4 is a perspective view, partially cut away, of a second embodiment of an engine configured in accordance with the instant invention.
Figure 5:
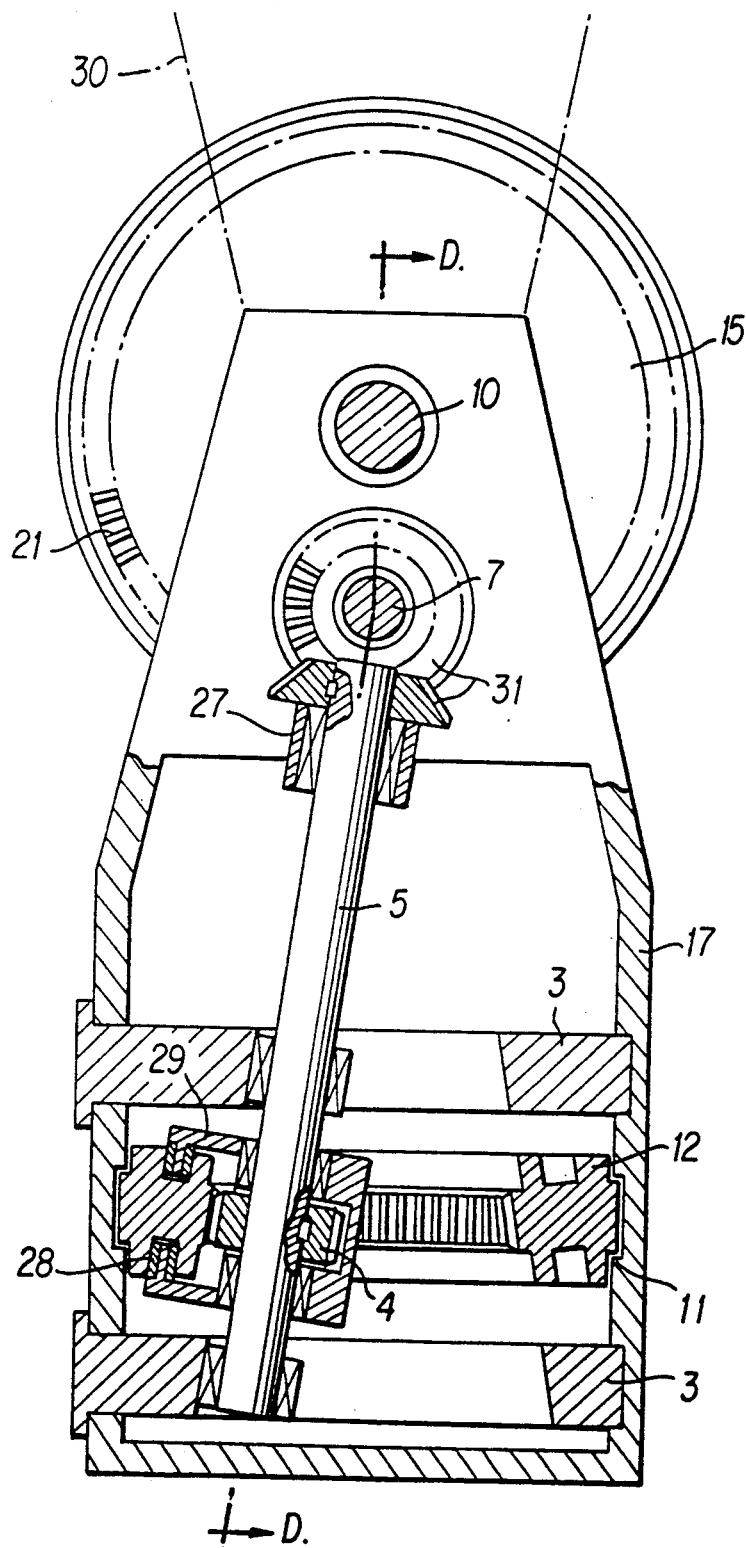
FIG. 5 is a side elevation of the engine of FIG. 4 taken along line 5—5 of FIG. 4.
Figure 6:
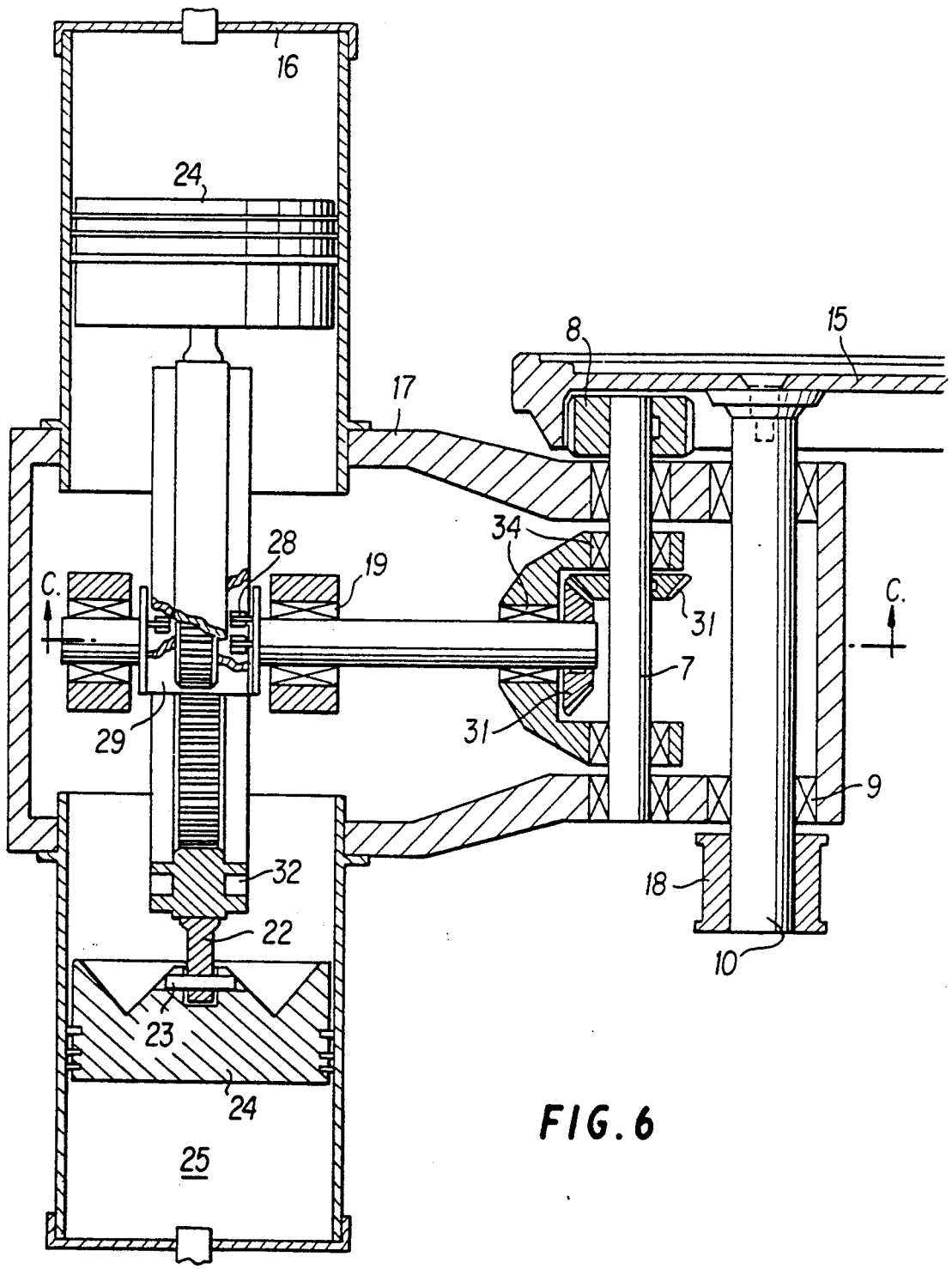
FIG. 6 is a top elevation of the engine of FIG. 4 taken along line 6—6 of Figure.

Referring now to the second embodiment of the invention set forth in FIGS. 4, 5 and 6 where structure similar to that disclosed in FIG. 1 has similar reference numerals; it is seen that a shaft 45 begins in the bearing 19 in the slot in thrust post 3 and extends forward entering an interlocked guider assembly 29 and bearing 29B. Passing through the oval gear area in which the drive gear is affixed to the floating shaft 45 and meshing with the oval slider gear track 12, the floating shaft 45 continue forward, exiting through front side of interlocked guider assembly 29 and bearing 29B. The shaft 45 thereafter continues forward, passing through the second thrust support post 3 and is supported by bearings 19 in the post. The shaft 45 then continues outward and enters bearing 34 in housing 27. A conical gear 31 is attached to the end of the shaft 45.

Positioned perpendicular to the conical gear is a drive corner shaft 46 journaled in bearing 35 mounted in the housing 17. The shaft 46 extends through the thrust angulating housing assembly 27 and is journalled therein by angulating housing bearing 34. The shaft 4 receives the thrust angulating gear 48 and meshes with the floating shaft gear 31. The shaft 46 continues through the angulating housing bearings 34 which are housed in the thrust angulating housing assembly 27, passes through right bearing 35 and is attached to drive gear 8 which meshes and drives the internal gear surface 51 to the flywheel 52. This is attached to an output drive shaft 53 which is journalled as needed by bearings 54. An output drive pulley 54 is attached to shaft 53.

Figure 7:
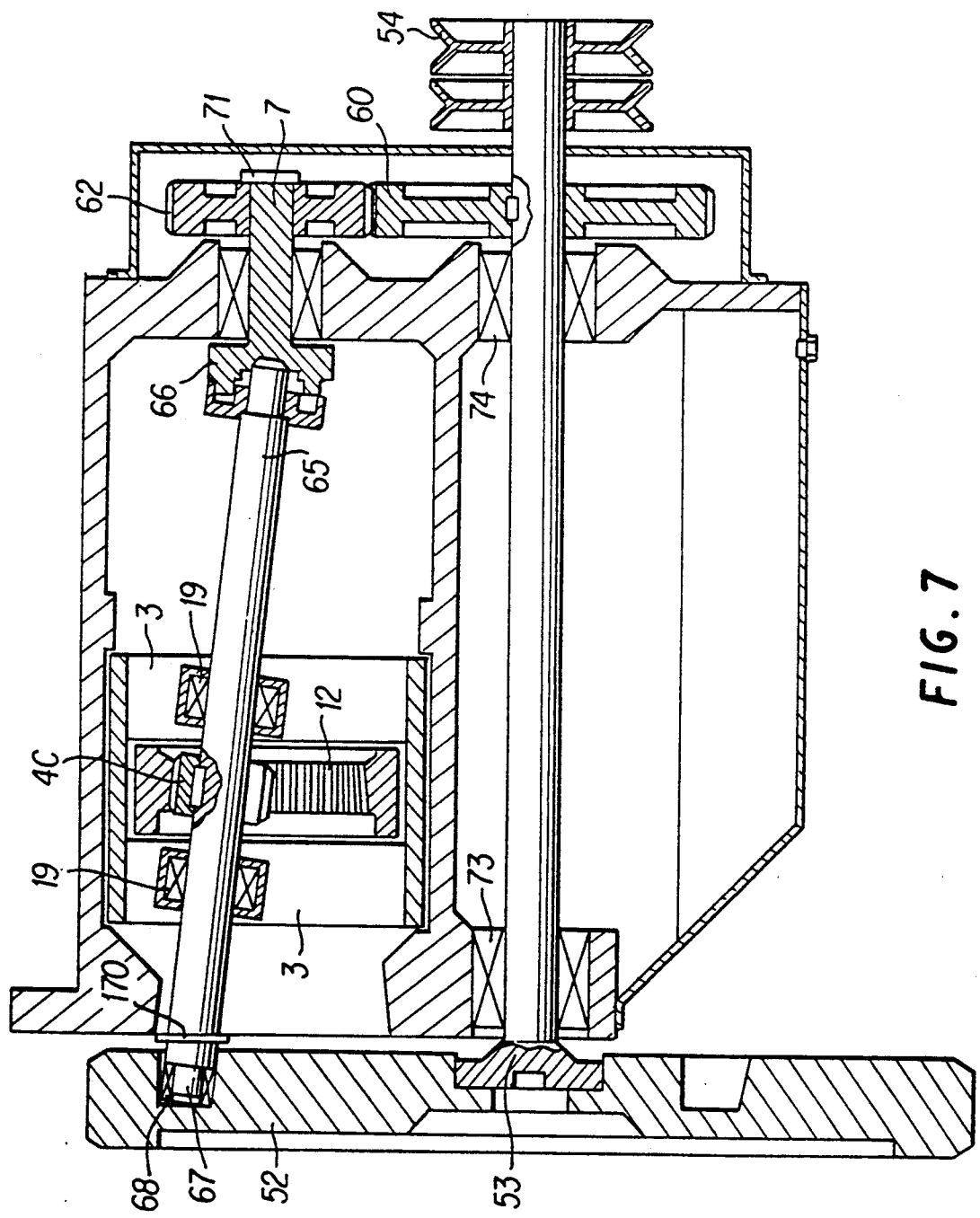
FIG. 7 is a side elevational view showing a third embodiment of the invention.
Figure 8:
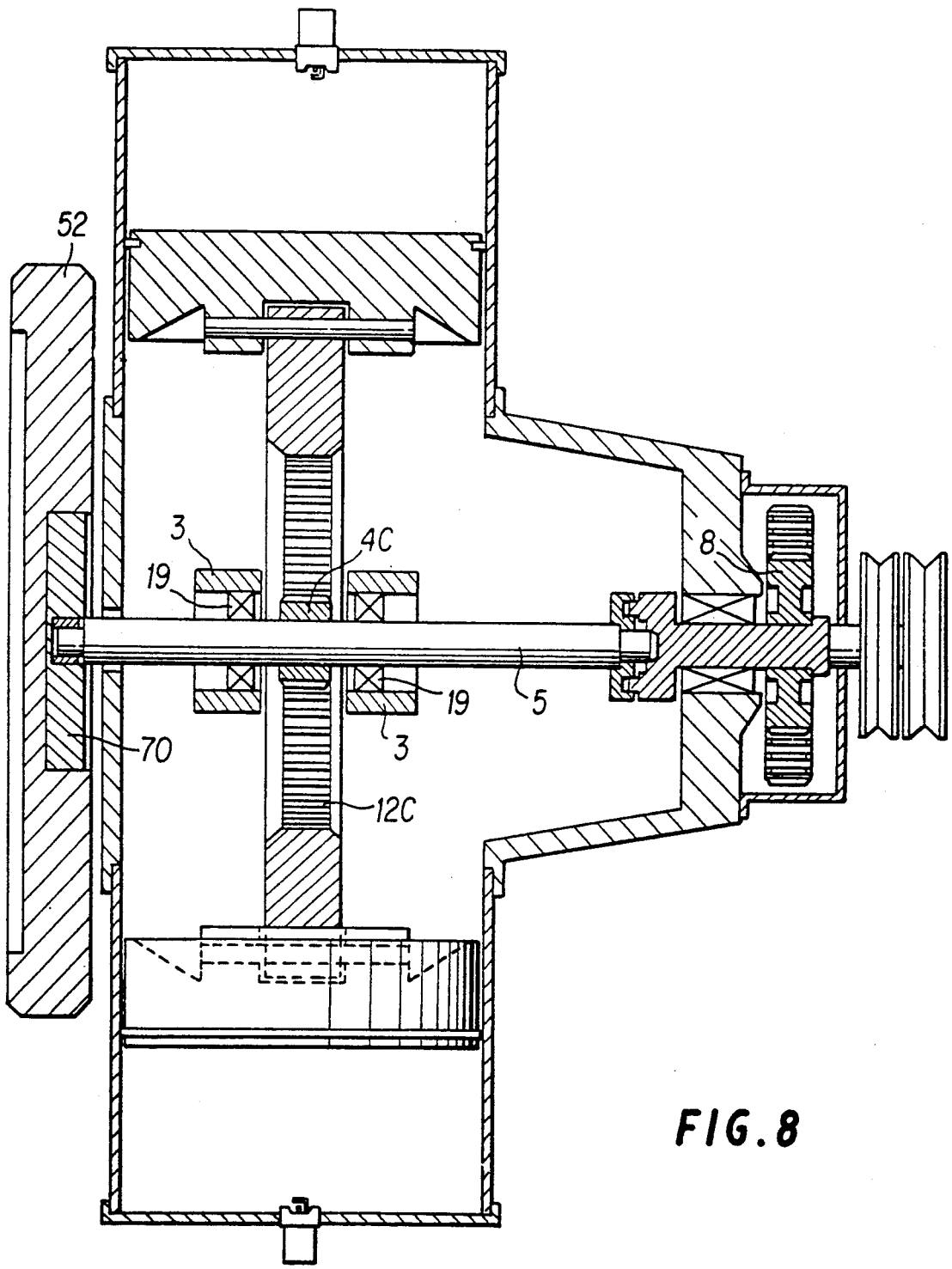
FIG. 8 is a top elevational view showing the embodiment of FIG. 7.
Figure 9:
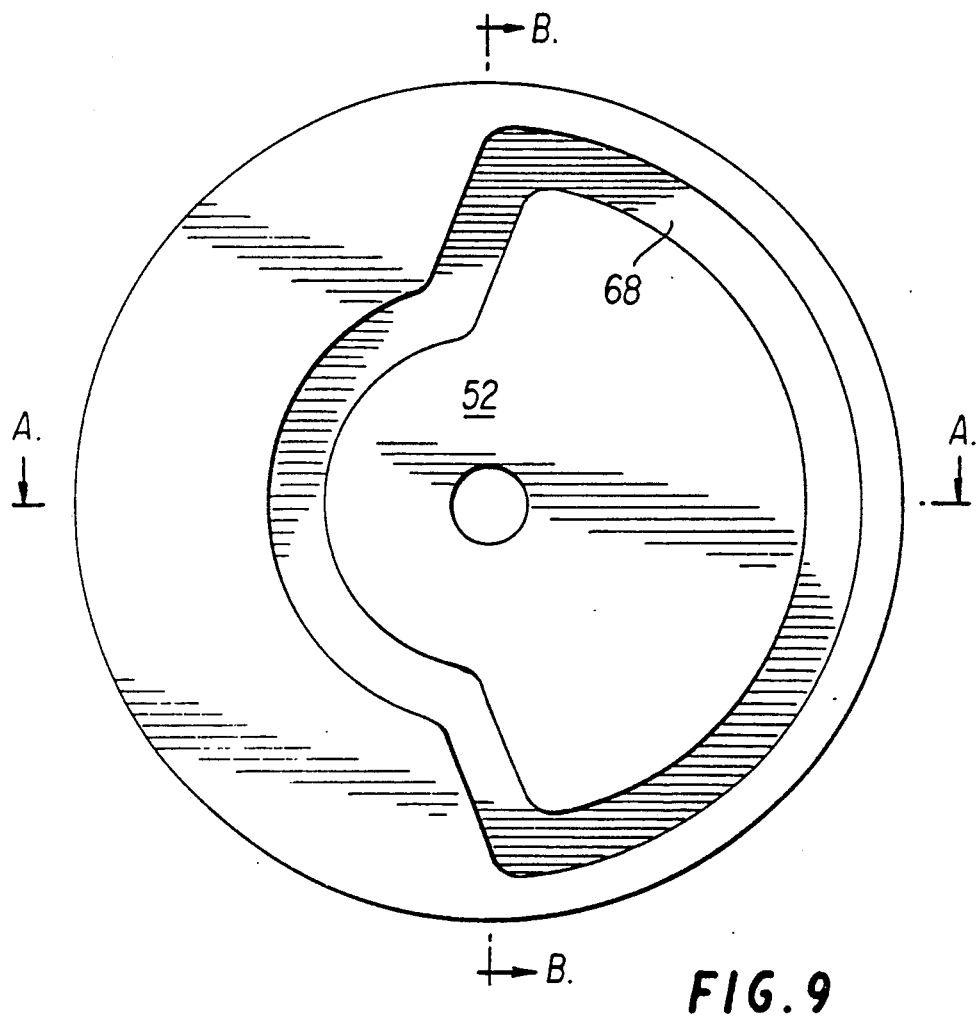
FIG. 9 is a rear view of a flywheel with a groove therein for converting the motion of the oscillatory shaft to rotary motion about a stationary axis.
Figure 10:
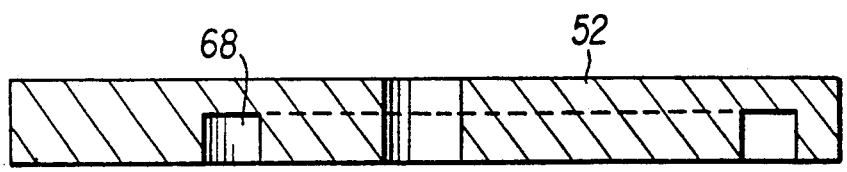
FIG. 10 is a cross-section taken along lines 10—10 of FIG. 9.
Figure 11:
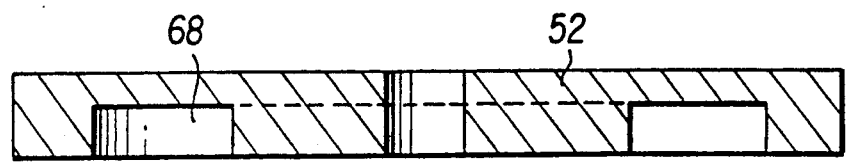
FIG. 11 is a cross-section taken along lines 11—11 of FIG. 9.

Referring now to FIG. 7, there is shown a third embodiment of the invention, wherein the oscillating shaft 65 is restrained at one end by a constant velocity joint 66 and has its free end 67 received in a groove 68 disposed in a flywheel 52. The flywheel 52 is mounted on a shaft 53, which is journalled in the engine housing by bearings 73 and 74. The shaft 53 has a gear 60 at the end thereof, which meshes with a gear 62 that is journalled on the shaft of the constant velocity joint 66. Pulleys 54 are also mounted on the end of the shaft 53 to take power therefrom. As seen in top view of FIG. 8 and in FIGS. 9-11, the slot 68 in the flywheel 52 in configured to give the flywheel 52 a constant velocity as the oscillating shaft 65 is driven by the linearly oscillating rack 12.

Figure 12:
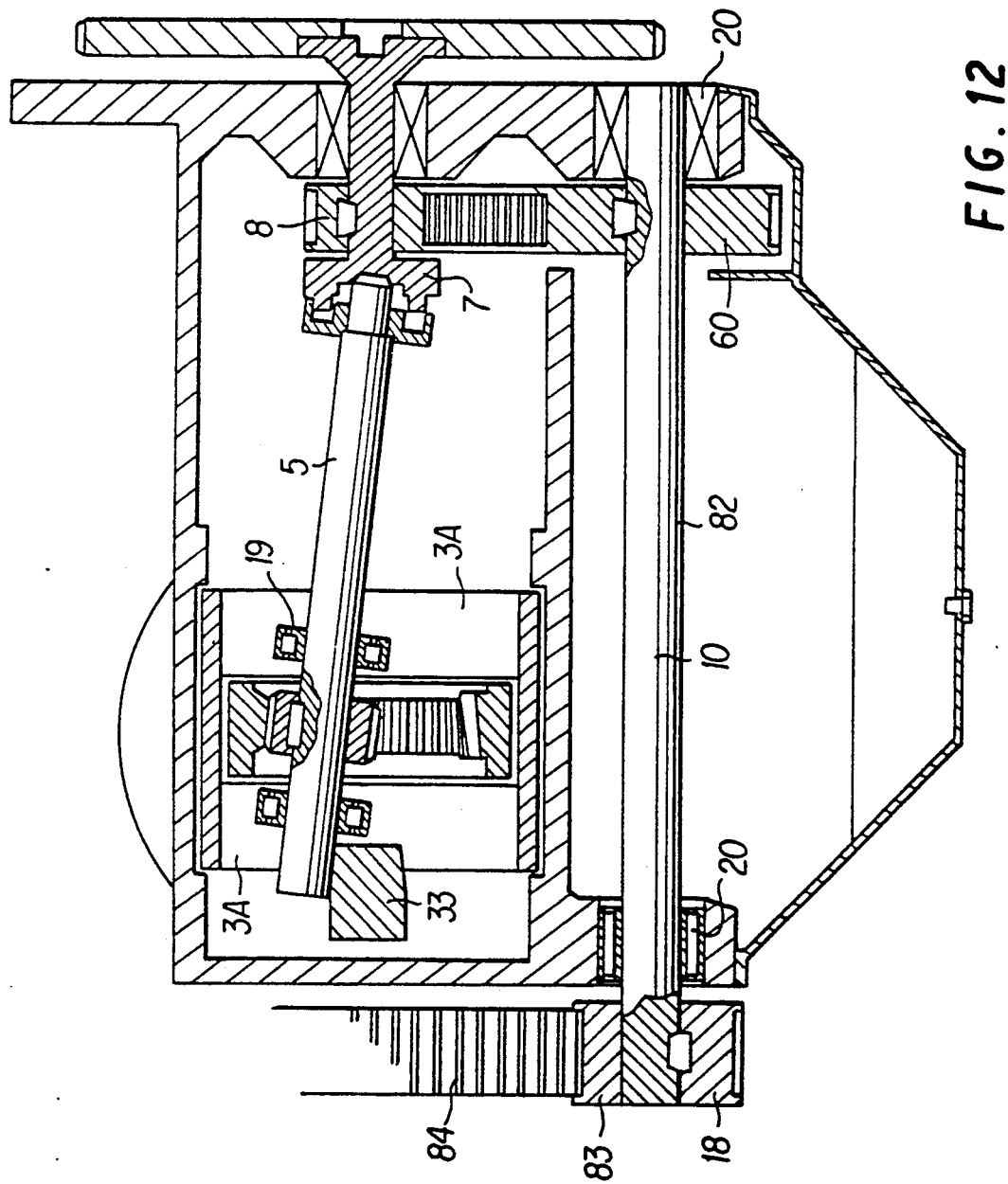
FIG. 12 is a side elevational view of a fourth embodiment of the invention.
Figure 13:
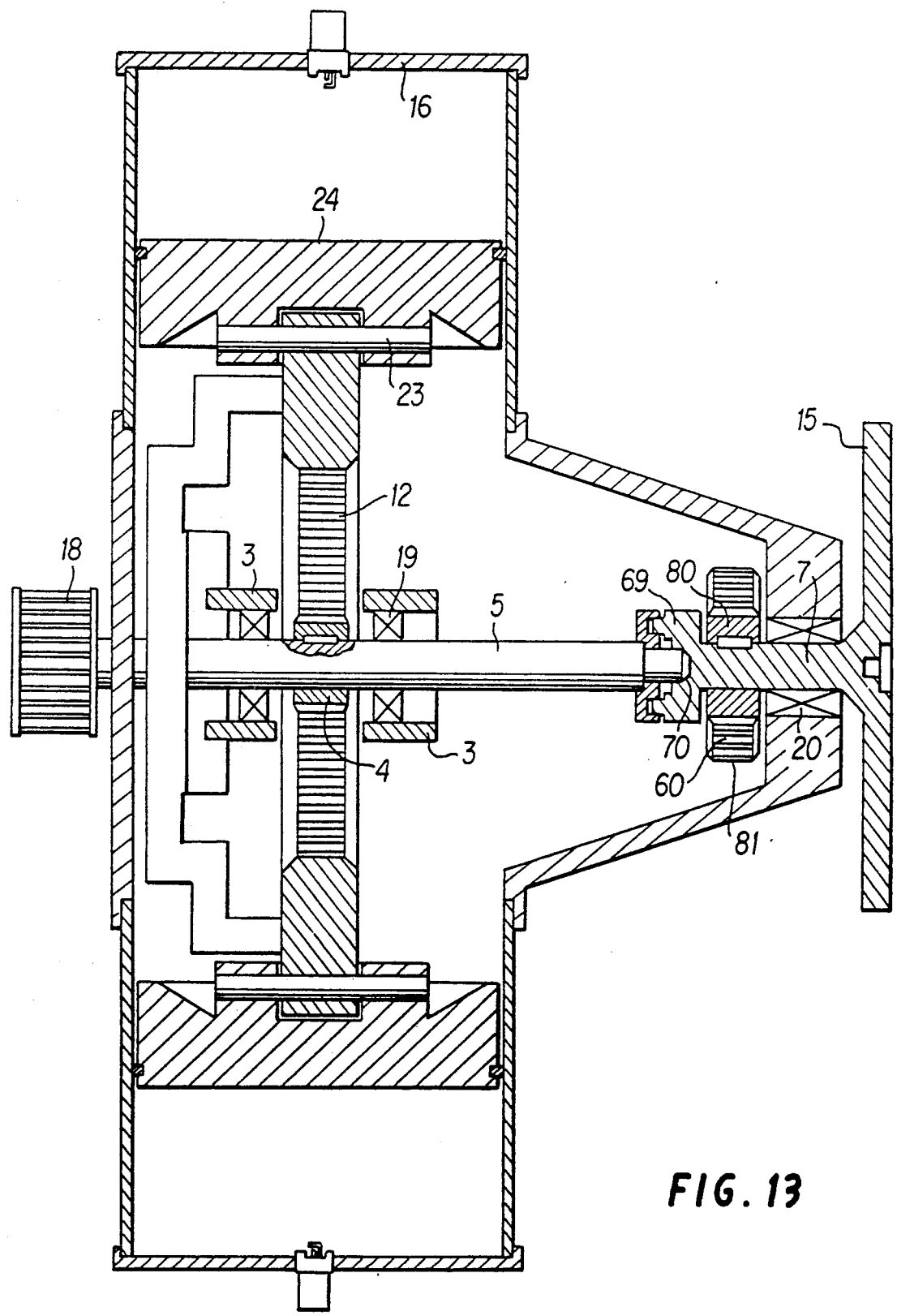
FIG. 13 is a top elevational view of the embodiment of FIG. 12.

Referring now to FIGS. 12-13, there is shown a fourth embodiment of the invention, wherein flywheel 15 is driven by rotating, oscillating drive shaft 5 as the drive shaft pivots about area 70 in swash plate 69. The swash plate 69 drives a first gear 80, which meshes with a second gear 81 that, in turn, drives a shaft 82 (FIG. 12) to rotate a third gear 83. The gear 83 meshes with output gear 84. The aforedescribed structure utilizes the linearly oscillating rack 12 used in embodiments 1, 2, and 3 of the invention.

Figure 15:
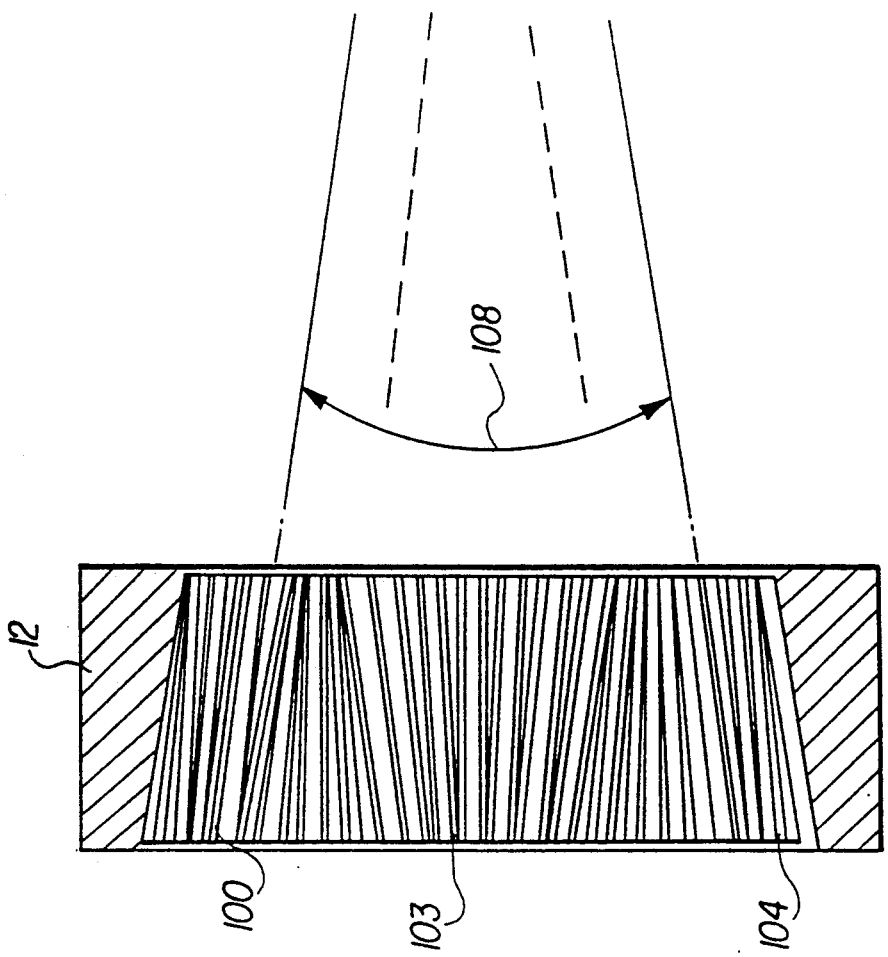
FIG. 15 is a side view looking into the track end portion shown in FIG. 14.
Figure 14:
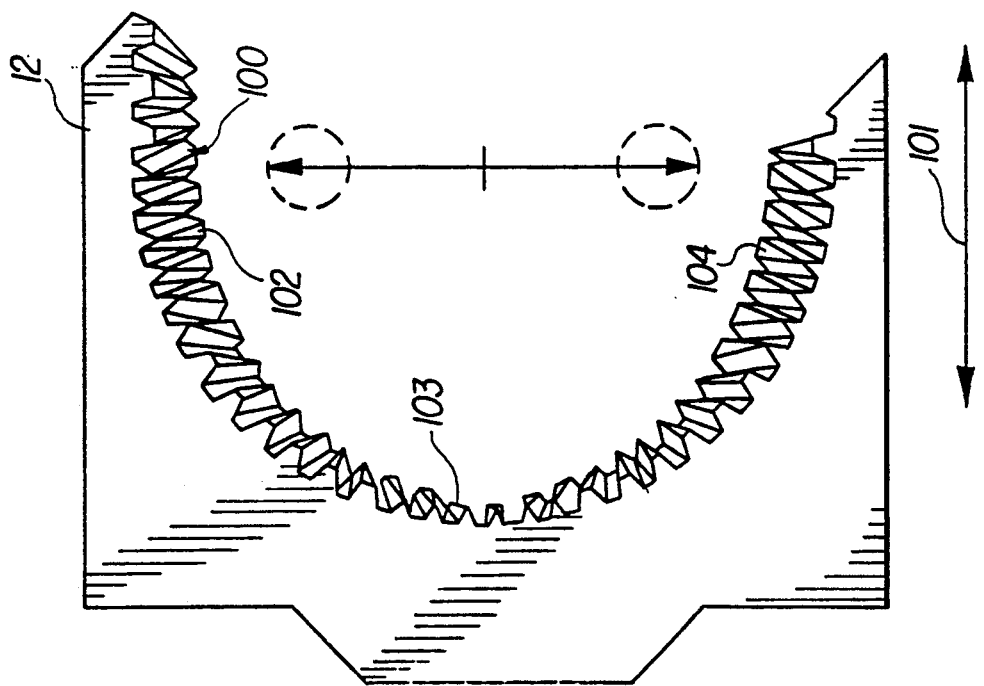
FIG. 14 is a front view of one end of the toothed track used in FIGS. 1-13, the other end of the toothed track being similarly configured.

Referring now to FIGS 14-18, there is shown a tooth configuration for the rack 12, wherein the teeth, designated generally by the numeral 100, are shaped to accommodate linear oscillation of the rack 12 in the direction of arrows 101. As is seen in FIGS 14 and 15, the teeth 102 at the top of the rack are shaped differently from the teeth 103 at the end of the rack and the teeth 104 at the bottom of the rack to accommodate oscillation of the gear 4 in drive shaft 5 in a plane orthogonal to the plane including arrow 101, as illustrated by arrow 108.

Figure 16A:
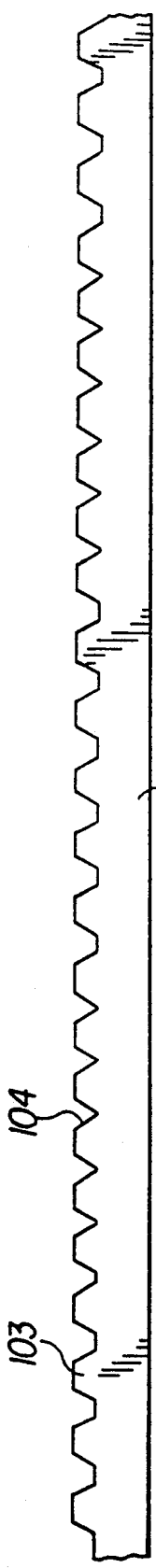
FIG. 16A, 16B, and 16C are tooth profiles along the upper and lower straight sections of the track showing an edge view, a planar view, and an individual tooth.
Figure 16B:
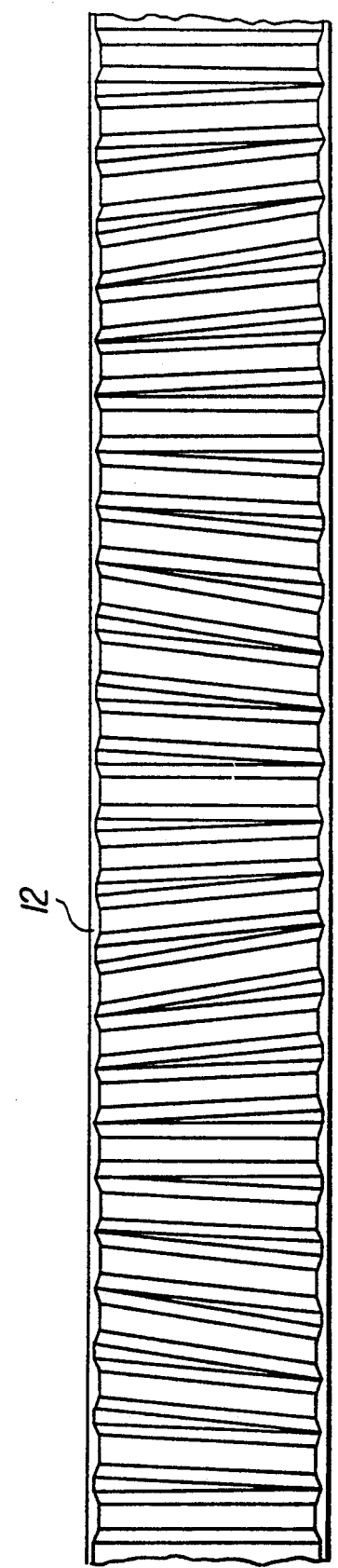
Figure 16C:
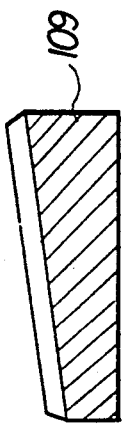

As is seen specifically in FIGS. 16A, 16B, and 16C, the wedge-shaped gear teeth 109 are shown with a repetitive pattern, which repeats over the straight section of the rack 12D of FIG. 14.

Figure 18:
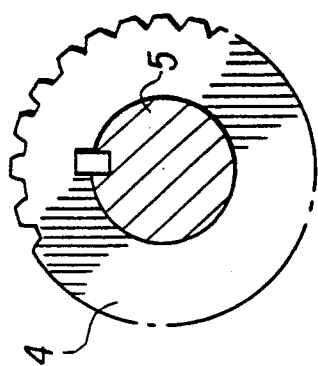
FIG. 18 is a side view of the gear of FIG. 17.
Figure 17:
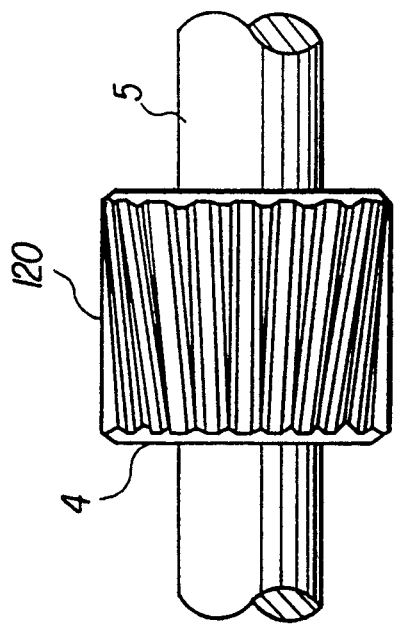
FIG. 17 is an end view of the year which runs on the track.

Referring now more particularly to FIGS. 17 and 18, it is seen that the gear 4 has an array of teeth 120, which are designed to mesh with the array of teeth of the track 12, wherein the gear tooth pattern repeats itself on the gear 4 in the same manner as the gear teeth on the track 12 repeat their pattern. Consequently, the gear 4 does not bind on the teeth 100 of the track 12.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A gearing arrangement for converting linear motion to rotary motion, the gearing arrangement comprising:

an enclosed bevelled track for reciprocation in an axial direction having opposed, spaced apart, parallel straight portions which are joined by curved end portions, each straight and end portion having first, second and third helical gear sections of differing tooth configurations positioned in a repetitive ordered array on the surface of the track, the first section having teeth oriented to extend at a positive angle with respect to the axial direction, the second section having teeth oriented to extend perpendicular to the axial direction and the third section having teeth oriented to extend at a negative angle with respect to the axial direction;

means for restraining the enclosed track for reciprocal movement in the axial direction;

a pinion having a bevelled gear surface with first, second and third sections thereon complementing the first, second and third sections of the enclosed tracks; and means for holding the pinion in engagement with the enclosed track.

2. The gearing arrangement of claim 1 wherein the means for holding the pinion in engagement with the enclosed track includes a shaft secured to the pinion; pivot means for supporting the shaft, and means for restraining traverse motion of the shaft to an arc which is perpendicular to the axial direction of motion of the enclosed track.

* * * * *